Aug. 19, 1941.    S. K. BROWN ET AL    2,253,263
TEMPERATURE INDICATING AND TEMPERATURE CONTROLLED AND CONTROLLING DEVICE
Filed Dec. 20, 1939    2 Sheets-Sheet 1
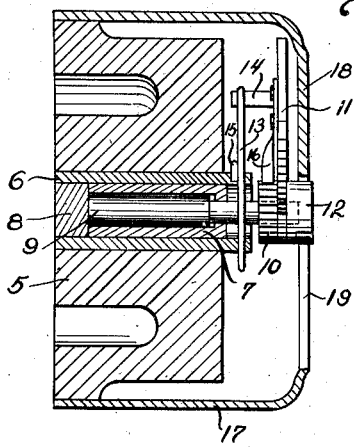
Fig. 1
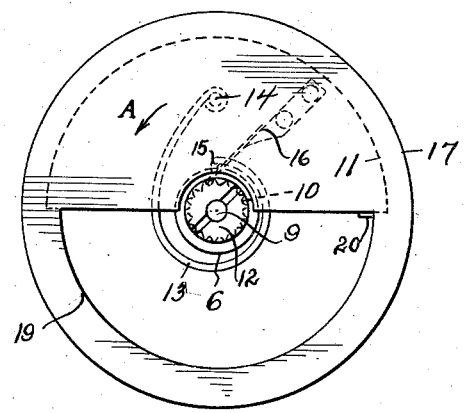
Fig. 2
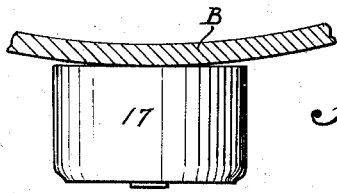
Fig. 3
Fig. 4
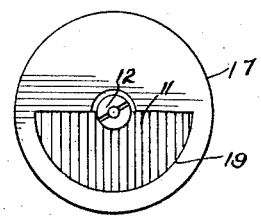
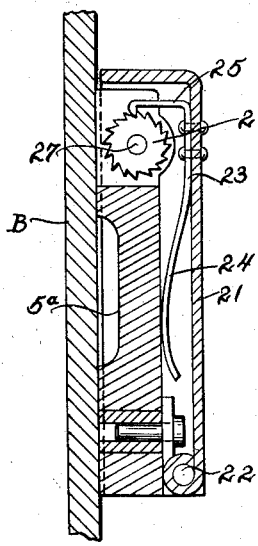
Fig. 5
Inventor
Stewart K. Brown and
Wellington B. Sullivan
By Shepherd & Campbell
Attorneys

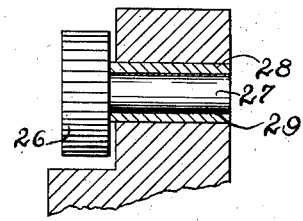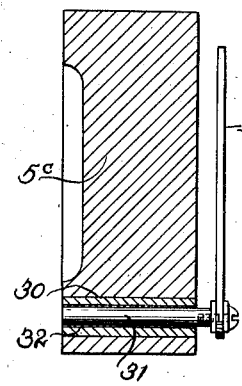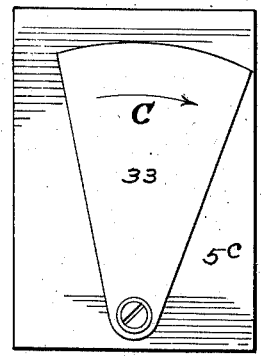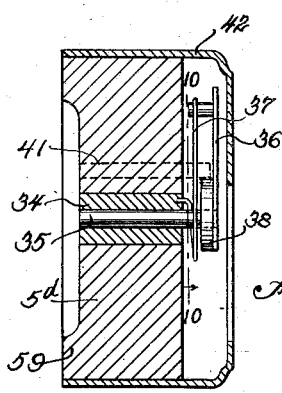

Patented Aug. 19, 1941

2,253,263

UNITED STATES PATENT OFFICE 2,253,263

TEMPERATURE INDICATING AND TEMPERATURE CONTROLLED AND CONTROLLING DEVICE

Stewart K. Brown, Alexandria, Va., and Wellington B. Sullivan, Silver Spring, Md.

Application December 20, 1939, Serial No. 310,260

13 Claims. (Cl. 116—101)

The object of this invention is to provide a very simple and inexpensive device, of a nature to be easily and quickly applied to surfaces of mechanisms which are subject to variations of temperature under their conditions of use, the said device serving to indicate when such surface has reached a predetermined temperature. In some of the forms illustrated, the device also serves to control the mechanism to which it is applied, to the end that further rise of temperature is prevented.

This invention also serves to indicate whether the surface to which it is applied has reached an undesirable temperature since the last inspection of the device, even though such undesirable temperature may not be existing at the moment of a succeeding inspection. Important novel characteristics and capabilities of the device of this invention will be set forth in the detailed description which follows.

In the accompanying drawings, in which like reference characters designate corresponding parts throughout the several views:

Figure 1 is a central vertical sectional view of a structure illustrating one embodiment of the invention;

Fig. 2 is a front elevation of the structure of Fig. 1;

Fig. 3 is a plan view illustrating the device applied to a part subject to changes of temperature, as hereinafter described;

Fig. 4 is a face view of the device of Fig. 1, illustrating the signal disc in its dropped or indicating position;

Fig. 5 is a vertical sectional view of a modified form of the invention;

Fig. 6 is an enlarged fragmentary sectional view through the ratchet wheel and associated parts of Fig. 5;

Fig. 7 is a vertical sectional view of a further modification;

Fig. 8 is a front elevation of the structure of Fig. 7;

Fig. 9 is a vertical sectional view of a further modification;

Fig. 10 is a sectional view on line 10—10 of Fig. 9 with the casing in elevation, and Fig. 11 is a diagrammatic view illustrating some of the uses served by the device.

Broadly stated, the invention, in all of its embodiments, contemplates the use of a mass constituting both a thermal and a magnetic element. The magnet is a permanent one, of such strength as to hold the device upon metal surfaces, the temperature of which is to be indicated or controlled, and the heat transmitting capacity of the mass is such as to transmit the heat necessary to cause control elements, such as fusible bodies, bimetallic strips, or the like, to function as hereinafter described.

Further, the thermal capacity of the mass is preferably such as to introduce a reasonable time lag in the functioning of the device, since many of the mechanisms to which the device will be applied for protective purposes may be subjected, without injury through limited periods, to temperatures which, if continued through long periods of time, would cause serious damage to such mechanisms.

Referring now to Figs. 1 to 4, 5 designates a metallic mass, of such size and composition that it may be caused to serve as the combined thermal and magnetic mass above referred to. We preferably employ an alloy of aluminum, nickel and cobalt, known to the trade as "Alnico," but we contemplate the use of any material which will have the same general characteristics and capabilities as Alnico.

Such a metal is capable of being permanently magnetized, and when magnetized will have sufficient magnetic strength to support not only its own weight but the weight of the associated parts, and thus serve to hold the whole structure securely upon a metallic surface that is to be protected. By "protected," we mean that the device of the invention will indicate excessive temperature rise in the part protected, or that it will function to bring about a stoppage of such mechanism until the conditions responsible for such excessive temperature rise have been corrected.

A steel insert 6 receives a brass sleeve 7 and a brass plug 8. A brass rotor or shaft 9 is soldered within the sleeve 7, this solder constituting a fusible link between the stationary brass sleeve and the rotor or shaft 9. A ratchet wheel 10 is fixed upon the shaft 9. A half disc 11 is mounted to turn upon the outer end of the shaft 9 and is held in place by nut 12. A spring 13 has its outer end fixed to a pin 14 which projects rearwardly from the face of the half disc 11, the inner end of this spring being fixed at 15 to the steel insert 6. A pawl 16 is carried by the half disc, and the end of this pawl engages the teeth of the ratchet wheel 10.

Thus the spring normally tends to swing the half disc in the direction of the arrow A in Fig. 2 but is restrained from doing so by the fact that the end of the pawl 16 is engaged with a ratchet wheel which is immovable until the fusible link, constituted by the solder, melts. When this solder melts, the ratchet wheel is free, and the half disc, pawl and ratchet wheel all turn bodily together in the direction of the arrow A until the disc is brought to substantially inverted position or until it lies below instead of above the shaft 9.

The structure described is contained within a casing 17, the upper half of the front of which is closed as indicated at 18, and the lower half of which is open, as indicated at 19. When the disc is brought to its lower or indicating position, it is visible through the open lower half of the casing, and thus serves to indicate to an observer that the mechanism has been actuated by the existence of enough heat to melt the solder.

The outer face of the disc is preferably distinctively colored, red, for example, and thus a mere glance at this signaling device will show an observer whether the signal has been actuated. Fig. 4 shows the appearance of the signal after the disc has moved to indicating position. A stop 20, Fig. 2, may be employed to limit the movement of the half disc when in its upper position.

In Fig. 5, a thermal magnetic mass 5ª is shown applied to a metallic surface B, which may be the wall of an electric transformer, the water jacket of an internal combustion engine, or any other surface to be protected. In this case, a cover 21 is hingedly connected at 22 to the mass 5ª. A strip of spring material 23 is secured to the inner face of the cover, the tail 24 of which bears against the mass 5ª and tends to throw the cover 21 outwardly and downwardly.

This tendency of spring 24 to throw the cover outwardly is resisted by a pawl 25, which is constituted by an inwardly turned end of the strip 23. This pawl engages the teeth of a ratchet wheel 26, said ratchet wheel being fixed upon a shaft 27 and said shaft in turn being held against turning by being soldered to a preferably brass sleeve 28 (Fig. 6), said sleeve in turn being carried by the mass 5ª.

The solder is indicated at 29 and constitutes a fusible link. When this solder melts under the influence of excess heat, the ratchet wheel is free to turn and the spring acts to throw the cover open. The fact that the cover is open warns the inspector that the surface B has been, at some time since the last inspection, subjected to a temperature beyond the range intended.

Figs. 7 and 8 are intended to illustrate a very simple form of the invention, in which the magnetic thermal mass 5ᶜ carries a sleeve 30, within which a shaft 31 is soldered as indicated at 32. The outer end of this shaft carries a flag 33, and in the initial setting of the device, this flag may be tipped slightly beyond the vertical in one direction or the other to cause it to tend to fall, as for example, in the direction indicated by the arrow C in Fig. 8, when the solder or other fusible material 32 melts.

In Figs. 9 and 10, we have indicated a structure employing a bimetallic strip as the heat affected element in lieu of the fusible material. This structure is very similar to that illustrated in Fig. 1 and comprises a thermal magnetic mass 5ᵈ, sleeve 34, central shaft 35, half disc 36 and spring 37, all functioning like the corresponding parts in Fig. 1. However, in lieu of the ratchet wheel, a cam 38 is provided on shaft 35, said cam having a shoulder 39. The action of the spring tends to move this shoulder against the end of a bimetallic strip 40.

This strip 40 is carried by a shank 41, of considerable mass, and which shank passes through and thus is in heat exchange relation to the mass 5ᵈ. Upon heating of the mass beyond a predetermined degree, the bimetallic strip 40 flexes upwardly enough to free its free end from the shoulder 39, whereupon the spring acts to throw the half disc downwardly to indicating position, it being understood that this structure contemplates the use of a cover 42, like the corresponding element of Fig. 1.

If desired, an adjusting screw 40ª may be employed to effect what is, in substance, a stiffening of the bimetallic strip to thus vary the temperature at which the device will function. Adjusting screws of this nature are common in conjunction with thermally actuated bimetallic strips, in many relations. By "thermal mass" as used in the accompanying specification and claims, we mean a mass composed of a metal and in sufficient size to take up and transmit to a thermally actuated element (fusible link or bimetallic strip) the necessary degree of heat to cause the latter to function. This thermal mass should also be of such capacity as to introduce a reasonable time lag, as hereinbefore set forth.

The diagrammatic Fig. 11 is intended to indicate that this device may serve to do more than give a merely visual indication. The half disc, or any other moving part of the structure, may, when released and actuated, control an electric circuit. In Fig. 11, the half disc 11 has been shown as having moved a contact strip 43 toward a contact strip 44 to thus close a circuit at 45 and energize the circuit 46. The closing of this circuit may be caused to sound an alarm, as through the medium of a bell 47, or it may be utilized to energize the magnet 48 of a relay. The armature 49 of this relay may be utilized to open or close another circuit. For example, the conductors 50 may constitute parts of the ignition circuit of an internal combustion engine, to the water jacket of which the magnetic mass of the signal was caused to magnetically adhere. In such a case, any failure of the flow of cooling water through the water jacket of the engine would automatically interrupt the ignition circuit and bring the engine to a stop.

While this description has treated primarily of the use of the device to indicate abnormal rises of temperature, it is clear that it could also be used to indicate the existance of abnormally low temperatures by merely changing the nature of the bimetallic element 40. That is to say, if this bimetallic element were such as to cause its free end to flex upwardly upon decrease of temperature rather than upon increase of temperature, then the signal would function when such abnormally low temperature was reached.

One of the important uses of the device of the present invention is in connection with electric transformers such as are used by electric light and power companies. Most of these transformers contain a body of oil, and it is the present practice to have men test the temperature of the oil in the transformer from time to time to determine whether a given transformer is being overloaded. This requires that the men doing this work climb to positions of considerable elevation to reach the transformers, since the latter are usually upon elevated structures. By the use of the device of the present invention, the condition of the transformer may be determined by a mere visual inspection from the ground, and thus the injuries which have sometimes been caused by men being burned or falling, may be avoided.

As is illustrated in Fig. 3, it is only necessary to place an indicator, such as we have described, against the casing B of an overhead, oil-containing transformer to render it possible for an inspector to easily and quickly determine, visually, and from the ground, whether such transformer has been overloaded and consequently overheated. It is not necessary to tap any screw holes in the casing of the transformer in order to secure this result, since the device will adhere magnetically to the metallic casing of the transformer and will support its own weight as well as the weight of the signal parts associated therewith.

We are aware of the fact that it has heretofore been proposed to hold various kinds of objects in place upon magnetic surfaces through the medium of electromagnets. The use of such devices as these presuppose a condition where electric current is available. In many, even in most, of the places where our device will be found of the greatest utility, electric current is either not readily available or else the cost of making connection with it would be prohibitive.

Our invention contemplates the use of a permanent, self-contained magnet, but a magnet of a kind not commonly contemplated for use in such a relation as is herein described. Ordinary steel, which, in years past, has commonly been employed in attempts to make simple permanent magnets, would be wholly unsuitable for use in connection with the manufacture of the device of our invention, for the reason that magnets made of these formerly employed materials would not possess the strength to support the weight of a mass adapted to yield the heat exchange and time lag qualities necessary to the production of a satisfactory article of this sort.

It is to be understood that the several examples shown in the accompanying drawings are illustrative merely of the principles of the invention. Many ways will readily suggest themselves, to those skilled in the art, for the accomplishment of the desired result. Therefore, it is to be understood that the invention is not limited to the precise constructions set forth, but that it includes within its purview whatever changes fairly come within either the terms or the spirit of the appended claims.

Having described our invention, what we claim is:

1. In combination, signaling means controlled by temperature changes beyond a pre-determined degree, and a heat transmitting, metallic mass permanently magnatized and with respect to which mass said signaling means is mounted in heat exchange relation and through which mass heat is transmitted for the control of the signaling means.

2. In a device of the character described, the combination with a permanently magnetized, heat storing and transmitting mass, of an indicator comprising a movable part, a detent for controlling the movement of said part, said detent being in heat exchange relation to said mass, and means tending to move the indicator from one position to another, said detent being of a nature to be affected by heat transmitted thereto thru said mass to thereby control the indicator under temperature changes.

3. In a device of the character described, the combination with a permanently magnetized heat storing and transmitting mass, of an indicator comprising a swinging signal, a detent which normally prevents said signal from swinging, said detent being in heat exchange relation to the mass and being releasable when said mass reaches a pre-determined temperature, to thereby permit the signal to swing.

4. In a device of the character described, the combination with a permanently magnetized heat storing and transmitting mass, of an indicator comprising a movable part, a spring tending to move the part in one direction, a member normally held against movement with relation to the mass, thermally controlled means, operable when said mass reaches a pre-determined degree, to release the normally held member, and interengaging means between the movable part and the fixed member.

5. A structure as recited in claim 4 wherein the thermally controlled means comprises a body of fusible material.

6. A device of the character described, comprising a thermal and permanently magnetized mass, a rotative shaft fixed against movement with relation to said mass by a body of fusible material, a signal, means tending to move said signal to indicating position, and interengaging means between the shaft and the signal for holding the signal against movement until said fusible material is melted.

7. A device of the character described comprising a thermal mass, permanently magnetized, a shaft secured thereto by a body of fusible material, a ratchet fixed upon said shaft, a signal disc mounted to turn with respect to said shaft, a pawl carried by the signal disc engaging the ratchet, and a spring tending to move the disc, said disc being held by the engagement of the pawl with the ratchet until the body of fusible material melts.

8. A structure as recited in claim 7, in combination with a casing having a closed upper portion and an open lower portion, the said signal being visible through the open lower portion after it has been released and moved.

9. A device of the character described, comprising a thermal mass, permanently magnetized to a strength necessary to support its own weight and the weight of the parts carried thereby, a shaft passing through said mass, a body of fusible material holding the shaft against turning with respect to the mass, and a gravitally actuated flag upon the shaft, disposed in position to fall to indicating position whenever the shaft is released by the melting of the fusible material.

10. The combination with a body of metal, of a nature to constitute a thermal and permanently magnetized mass, magnetized to such strength as to be capable of supporting its own weight and the weight of the parts carried thereby, of a movable signal, means tending to move said signal in one direction and restraining means restraining said signal against movement, said restraining means comprising a bimetallic strip supported in heat exchange relation to said mass and engaging a shoulder portion carried by the signal.

11. The combination with a body of metal, of a nature to constitute a thermal and permanently magnetized mass, magnetized to such strength as to be capable of supporting its own weight and the weight of the parts carried thereby, of a movable signal, a shaft upon which the signal is mounted, a spring tending to move said signal in one direction, a cam upon the shaft having a shoulder, a bimetallic strip, the end of which engages said shoulder, and a heat transmitting member carrying the bimetallic strip, said member lying in intimate and heat exchange relation to said mass.

12. A device of the character described comprising a mass of metal, permanently magnetized to a strength to support itself and the parts carried thereby, an indicating member, and means causing said member to tend to move from one position to another position, thermally controlled means normally restraining said member and lying in heat exchange relation to said mass, said mass of magnetized metal serving to support the whole upon a metallic object, the temperature of which is to be indicated, and the heat from which is transmitted through said mass to the thermally controlled restraining means.

13. A signal of the character indicated, comprising an indicator arranged to tend to move from one position to another, means restraining said indicator of a nature to be responsive to a predetermined degree of temperature change, a magnetic metallic mass upon which the indicator and restraining means are carried, and with which mass the restraining means is in heat exchange relation to thereby be released upon a rise of temperature within said mass of a determined degree, the said mass being of such volume and nature as to be magnetizable to a strength sufficient to support the whole in contacting relation of said mass upon a heated metallic surface, and the volume of said mass being such in relation to the responsiveness of the restraining means to temperature, as to introduce a heat storing or time lag characteristic whereby a rise of temperature sufficient to release the restraining means when continued over a predetermined time is insufficient to release the restraining means when maintained for only a materially shorter period of time.

STEWART K. BROWN.
WELLINGTON B. SULLIVAN.